United States Patent [19]

Chang

[11] Patent Number: 5,079,053

[45] Date of Patent: Jan. 7, 1992

[54] APPARATUS FOR MAKING FURNITURE

[75] Inventor: Chao-Li Chang, Hsien, Taiwan

[73] Assignee: Taiwan Shin Yen Enterprise Co., Ltd., Taiwan

[21] Appl. No.: 576,217

[22] Filed: Aug. 31, 1990

[51] Int. Cl.[5] .............................................. B32B 3/20
[52] U.S. Cl. .................................. 428/35.8; 138/115; 428/36.9; 428/188
[58] Field of Search ..................... 428/188, 35.8, 36.9; 138/111, 115

[56] References Cited

U.S. PATENT DOCUMENTS

| | | | |
|---|---|---|---|
| 3,965,942 | 6/1976 | Hatch | 428/188 |
| 3,966,013 | 6/1976 | Hatch et al. | 428/188 |
| 4,374,881 | 2/1983 | Hamilton | 428/188 |

Primary Examiner—James J. Seidleck
Attorney, Agent, or Firm—Harness, Dickey & Pierce

[57] ABSTRACT

An apparatus includes an elongated flexible tube with an oblong cross section. A plurality of longitudinal partition walls are formed along the elongated tube. A plurality of slots are formed between the partitions into which are inserted a plurality of metal plates so as to strengthen the elongated tube. The tube is to be used to make furniture.

1 Claim, 3 Drawing Sheets

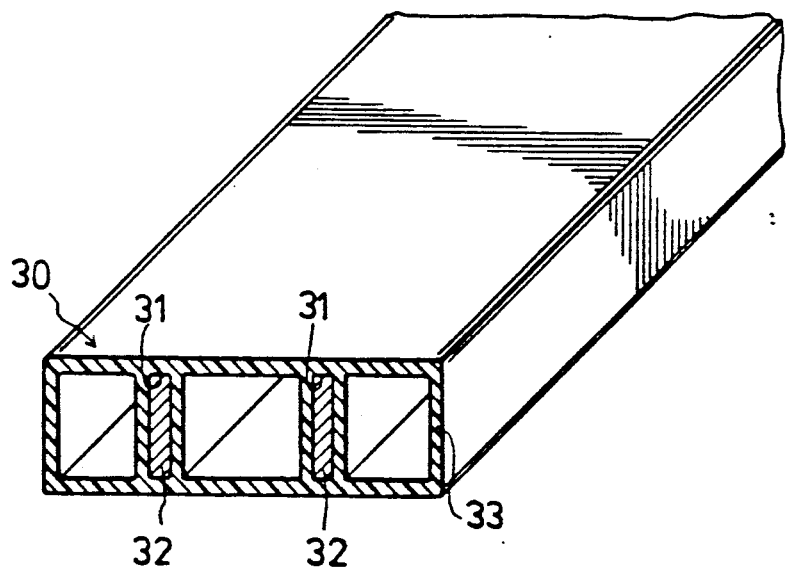
F I G. 4

APPARATUS FOR MAKING FURNITURE

BACKGROUND OF THE INVENTION

The present invention relates to an apparatus, more particularly to a flexible apparatus having an oblong cross section, which can be used to construct more durable and lasting furniture.

Most present day furniture is made of plastic and metal. One of such apparatus from which the furniture is made, is shown in FIG. 1. Said apparatus 10 has an oblong cross section 11 with three longitudinal partitions. A metal pipe 13 is disposed in the central channel 12 to make said tube, more rigid. The chair in FIG. 2 is made from such tubing. During the furniture making process, said tube has to be folded, cut, bent, or straightened. Though the tube which itself is flexible does not lose its compressive strength, the metal pipe disposed within is weakened. The finished product is therefore not as durable as it could be.

There is still another kind of structural tube 40 use to make furniture, as shown in FIG. 3, which is made solely of plastic materials. Its construction is a bit complicated and the manufacturing cost is high. Though this type of tube is easy to cut, bend, saw or straightened, but it lacks compressive strength and does not last long.

SUMMARY OF THE INVENTION

It is therefore the main object of the present invention to provide an apparatus which has more compressive strength, is easy both to produce, and to manipulate after production, and can be manufactured at a lower cost than the prior art apparatus.

Accordingly, it includes an elongated tube member having an oblong cross section, which is made of plastic materials. A plurality of longitudinal partition walls are formed in the elongated tube member. A plurality of slots are formed in-between the partition walls into which are inserted a plurality of metal plates to endow said elongated tube member with more compressive strength.

BRIEF DESCRIPTION OF THE DRAWING

Other features and advantages of the present invention will become more apparent in the following detailed description including drawings, all of which show a non-limiting form of the invention, of which:

FIG. 4 shows an apparatus of the present invention from which furniture is to be made.

DETAILED DESCRIPTION OF THE PREFERRED EMBODIMENT

Figure 1:
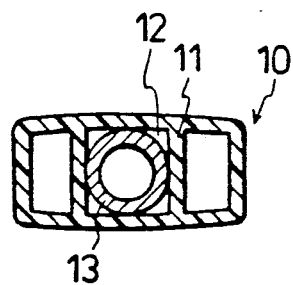
FIG. 1 shows an apparatus of the prior art from which furniture is made.
Figure 2:
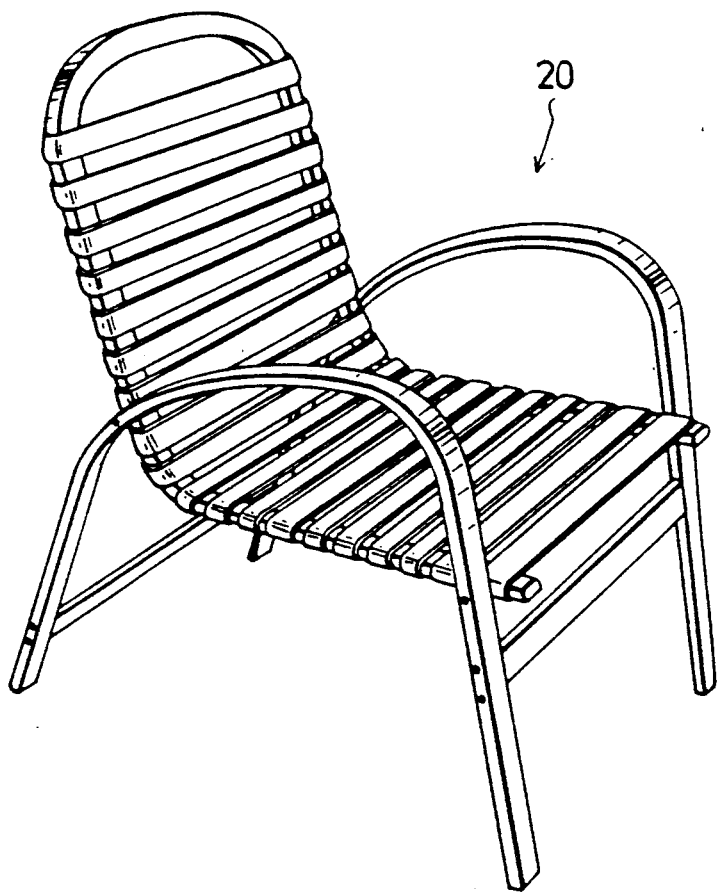
FIG. 2 illustrates a chair made with the apparatus shown in FIG. 1.
Figure 3:
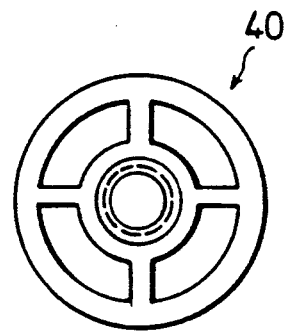
FIG. 3 shows another form of apparatus of the prior art from which furniture is made.
Figure 5:
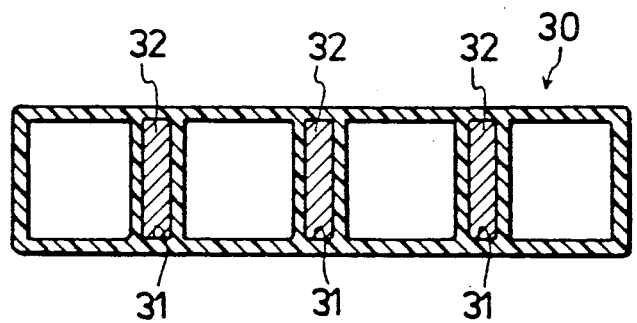
FIG. 5 shows another form of the apparatus of the present invention from which furniture is to be made.
Figure 6:
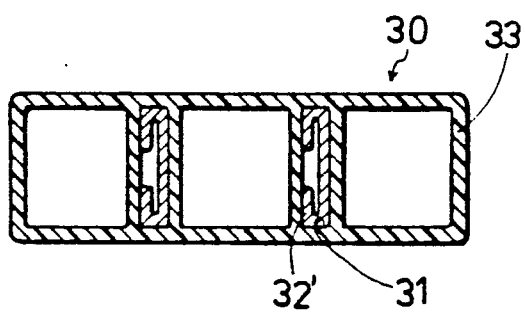
FIG. 6 shows still another form of the apparatus of the present invention from which furniture is to be made.

Shown in FIG. 4 is a cross sectional view of an apparatus of the present invention which is to be used to make furniture. Accordingly, it includes an elongated tube member 30, made of plastic materials, having an oblong cross section 33. A plurality of longitudinal partition walls are formed in the elongated tube member. A plurality of slots 31 are formed between the partition walls into which are inserted a plurality of metal plates 32 having sufficient thickness to strengthen the tube. FIG. 5 shows another form of elongated tube member 30 having more partition walls, more slots 31 between them than the first embodiment of the invention. The metal plates 32' can be thin with the long edges folded toward the center in two 90 degrees angles, to form a C-shape as shown in FIG. 6, so as to reduce the cost of manufacture. Such apparatus of this design has more compressive strength than the prior art tubes and the amount of metal plating used in this method is greatly reduced, thus the cost of manufacture is also lowered. The assertion is supported by an experiment, the results of which are as follows:

|  | A: prior art tube | B: present tube |
|---|---|---|
| 1. Thickness of plastic material | 2.3 mm | 2.3 mm length 70 mm width 23 mm |
| 2. Type of metal | steel | iron |
| 3. Diameter of metal tube | outer dia: 16.50 mm inner dia: 14.00 mm |  |
| 4. Outer dia: of plastic tube mem: | length 79 mm width 21 mm |  |
| 5. Thickness of metal plates |  | length 16 mm width 1.4 mm |
| 6. Dist: bet: 2 metal |  | 30 mm |
| 7. Compressive strenght | 94 kg | 118. 50 kg |

As indicated above, the apparatus made according to the present invention has more compressive strength than the prior one. Therefore furniture made of such tubing are more durable and lasting than that made from prior art tubing.

While the invention has been described in connection with what is considered to be most practical and preferred embodiment, the invention is not to be limited to the disclosure only, but on the contrary it is intended to cover various modifications and equivalent arrangements within the broadest interpretation of the present invention so as to encompass all such modifications and equivalent arrangements.

I claim:
1. An apparatus comprising:
   an elongated flexible tube member having an oblong rectangular cross section, said tube member being made from a plastic material;
   a plurality of elongated partition walls extending between the two opposite longer sides of said elongated flexible tube member;
   said partitions defining a plurality of slots therebetween; and
   a plurality of metal plates adapted to fit into said plurality of slots, and inserted into said slots to strengthen said elongated tube, each of said plates having a thickness smaller than that of said slots, said iron plates having generally C-shaped portions at two edges thereof.

* * * * *